US010351254B2

(12) United States Patent
Journade et al.

(10) Patent No.: US 10,351,254 B2
(45) Date of Patent: Jul. 16, 2019

(54) AIRCRAFT ENGINE PYLON

(71) Applicant: Airbus Operations S.A.S., Toulouse (FR)

(72) Inventors: Frederic Journade, Toulouse (FR); Eric Bouchet, Aussonne (FR); Gerard Coudouent, Fontenilles (FR); Bogdan Sina, Toulouse (FR); Romain Terral, Toulouse (FR); Sylvain Cros, Tournefeuille (FR); Jerome Puech, Toulouse (FR); Cyrielle Rogeron, Leguevin (FR)

(73) Assignee: Airbus Operations S.A.S. (FR)

( * ) Notice: Subject to any disclaimer, the term of this patent is extended or adjusted under 35 U.S.C. 154(b) by 398 days.

(21) Appl. No.: 15/292,173

(22) Filed: Oct. 13, 2016

(65) Prior Publication Data

US 2017/0106990 A1    Apr. 20, 2017

(30) Foreign Application Priority Data

Oct. 16, 2015    (FR) ...................................... 15 59830

(51) Int. Cl.
*B64D 27/26*    (2006.01)
*B64C 1/06*    (2006.01)

(52) U.S. Cl.
CPC .............. *B64D 27/26* (2013.01); *B64C 1/064* (2013.01); *B64D 2027/264* (2013.01); *B64D 2027/266* (2013.01)

(58) Field of Classification Search
CPC .............. B64D 27/26; B64D 2027/264; B64D 2027/266
See application file for complete search history.

(56) References Cited

U.S. PATENT DOCUMENTS

| 2008/0217502 | A1 | 9/2008 | Lafont | |
| 2009/0294579 | A1* | 12/2009 | Eve | B64D 27/18 244/54 |
| 2011/0011972 | A1 | 1/2011 | Vache | |
| 2011/0121132 | A1* | 5/2011 | Crook | B64D 27/18 244/54 |
| 2011/0204179 | A1* | 8/2011 | Skelly | B64D 27/26 244/54 |

(Continued)

FOREIGN PATENT DOCUMENTS

| FR | 2 889 505 A1 | 2/2007 |
| FR | 2 892 252 A1 | 4/2007 |
| WO | 2009/118469 A2 | 10/2009 |

OTHER PUBLICATIONS

French search report dated Jun. 21, 2016 (FR 15 59830).

*Primary Examiner* — Philip J Bonzell
*Assistant Examiner* — Tye William Abell
(74) *Attorney, Agent, or Firm* — Lerner, David, Littenberg, Krumholz & Mentlik, LLP

(57) ABSTRACT

An aircraft engine pylon includes two side panels and an upper stringer and a lower stringer assembled to form a strut assembly extending in a longitudinal direction (AX) corresponding to the direction in which the aircraft is moving and an internal reinforcement structure including a plurality of reinforcements. The pylon also includes a reinforcement zone on each side panel and a front housing to receive a main front center reinforcement and a rear housing to receive a main rear center reinforcement.

10 Claims, 5 Drawing Sheets

(56) References Cited

U.S. PATENT DOCUMENTS

| | | | |
|---|---|---|---|
| 2012/0056033 A1* | 3/2012 | Teulou | B64D 27/26 244/54 |
| 2012/0104162 A1* | 5/2012 | West | B64C 1/1453 244/54 |
| 2015/0013142 A1* | 1/2015 | West | B64D 27/18 29/525.08 |
| 2015/0251768 A1* | 9/2015 | Woolley | B64D 27/26 244/54 |
| 2016/0221682 A1* | 8/2016 | Pautis | B64D 27/18 |
| 2016/0238032 A1* | 8/2016 | Hill | F02C 7/20 |

\* cited by examiner

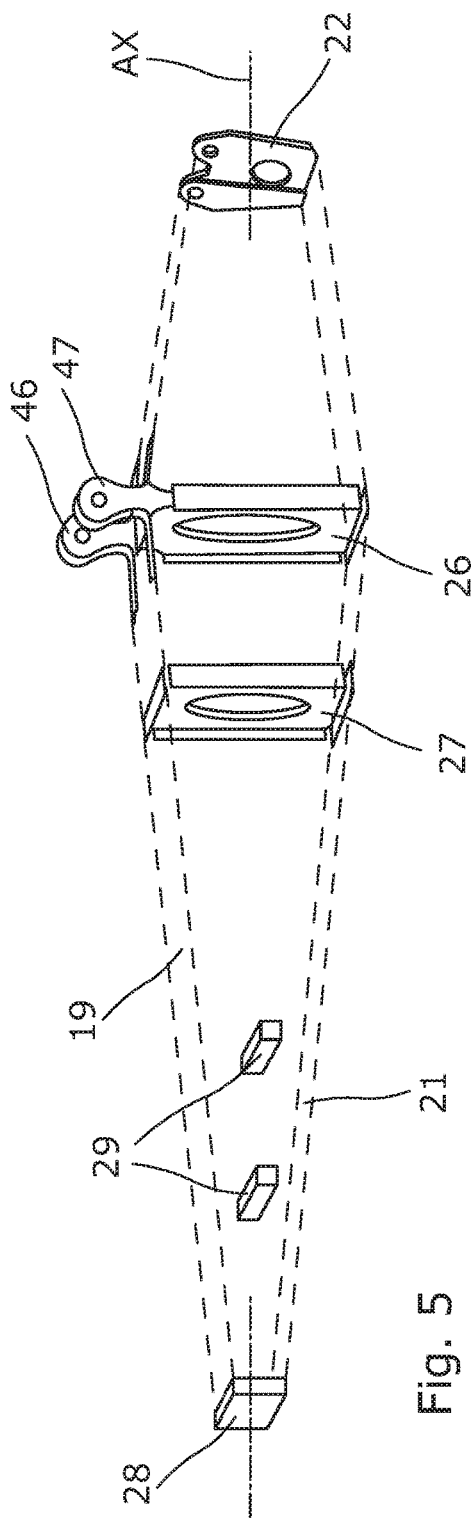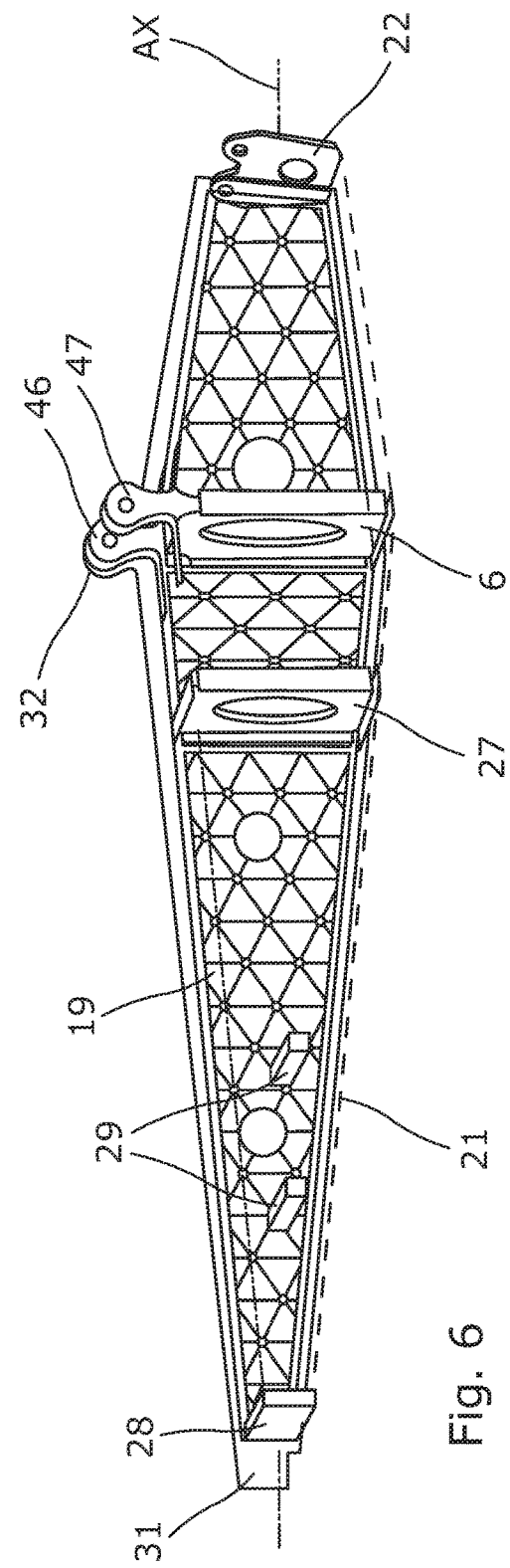

AIRCRAFT ENGINE PYLON

FIELD OF THE INVENTION

The invention relates to an aircraft engine pylon.

BACKGROUND OF THE INVENTION

A pylon traditionally comprises a mechanical structure which ensures the transfer of stresses between the engine and the airfoil and a fairing surrounding this mechanical structure.

As shown in FIG. 1, the mechanical structure of a pylon 1 of this kind is generally configured as a strut assembly delimited by an upper stringer 2 comprising a front portion 3 and a rear portion 4, a lower stringer 5 and two side panels 6 and 7.

This strut assembly is linked to the airfoil by a front airfoil attachment 8 and by a rear airfoil attachment which is not shown. This strut assembly is likewise linked to the engine by a front engine attachment 9 and by a rear engine attachment which is not shown.

This strut assembly contains structural components comprising a main front reinforcement 11 referred to as a pyramid, a main centre reinforcement 12 and a main rear reinforcement which is not shown. The main reinforcements are located level with the engine mounts and airfoil attachments and ensure transmission of the main stresses from the engine to the airfoil. Each of the main reinforcements is thereby joined to the two side panels 6, 7 and to the upper 2 and lower 5 stringers and optimizes the transmission of stresses.

This strut assembly moreover contains a plurality of secondary reinforcements 13 which are spaced regularly along a longitudinal axis AX of the pylon to give the strut assembly additional rigidity. Each secondary reinforcement 13 is also joined to the side panels 6, 7 and to the stringers, in order to provide the required rigidity between these components.

Hence, a pylon 1 of this kind comprises numerous components (up to 30 components depending on the type of aircraft). These components are generally made of metallic materials and increase the total weight of the aircraft.

BRIEF SUMMARY OF THE INVENTION

The present invention proposes a pylon which overcomes some or all of the disadvantages of the prior art.

An aspect of the invention relates to an aircraft engine pylon comprising a main front reinforcement, a main rear reinforcement, two side panels and an upper stringer and a lower stringer assembled one to the other to form a strut assembly extending in a longitudinal direction, each side panel comprising an internal face oriented towards the inside of the strut assembly and an external face oriented towards the outside of the strut assembly. The mast according to an embodiment of the invention is notable in that each side panel comprises on its internal face a reinforcement zone containing a network of stiffeners disposed in at least two different directions and zones in which the stiffeners intersect, as well as a front housing intended to receive a side edge of a main front centre reinforcement and a rear housing intended to receive a side edge of a main rear centre reinforcement.

The reinforcement zone is advantageously delimited by an upper longitudinal rib running along an upper edge of the side panel and a lower longitudinal rib running along a lower edge of the side panel, the upper and lower longitudinal ribs being joined at one of their ends by a front rib and at the other of their ends by a rear rib.

According to a variant of the embodiment, the strut comprises at least two panel fittings, each integrated in a side panel, and at least two reinforcement fittings integrated in the main rear centre reinforcement and each joined to one of the at least two panel fittings.

According to another embodiment, the strut comprises at least two rear fittings, each integrated in a side panel and at least two reinforcement fittings integrated in the main rear reinforcement and each joined to one of the at least two rear fittings.

Each of the reinforcement fittings preferably extends to the right of a side edge of the main rear centre reinforcement in a perpendicular direction to the longitudinal direction and each of the panel fittings extends from the upper longitudinal rib to the right of the rear housing.

Each of the rear fittings advantageously extends in the extension of the rear rib in a direction substantially perpendicular to the longitudinal direction.

According to a variant, the strut comprises at least two extensions each situated level with a front edge of the side panel, each of the two extensions exhibiting at least one wall extending in a direction parallel to the longitudinal direction, the wall being provided with a through-hole configured to receive a fixing component such as a pin or a bolt or a cam.

According to one variant, the strut likewise comprises a rear engine rear attachment comprising a mounting plate to the right of the front housing in the extension of the lower longitudinal rib and a consolidation zone comprising a thicker zone along the external face of the side panel level with the mounting plate.

The mounting plate advantageously comprises at least a first drill hole configured to receive a fixing component such as a pin or a bolt or a cam and the consolidation zone comprises at least a second drill hole configured to receive a fixing component such as a pin or a bolt or a cam.

The network of stiffeners preferably comprises a plurality of ridges arranged in a repeated pattern constituting a regular mesh over the entire surface of the reinforcement zone.

BRIEF DESCRIPTION OF THE DRAWINGS

Other characteristics, details and advantages of the invention will emerge more clearly from the detailed description provided below by way of indication in relation to the drawings in which:

FIG. 5 is a side view showing the stringers and the main reinforcements of the pylon according to an embodiment of the invention;

FIG. 6 is a side view showing the right panel equipped with the main reinforcements and stringers;

DETAILED DESCRIPTION

Figure 1:
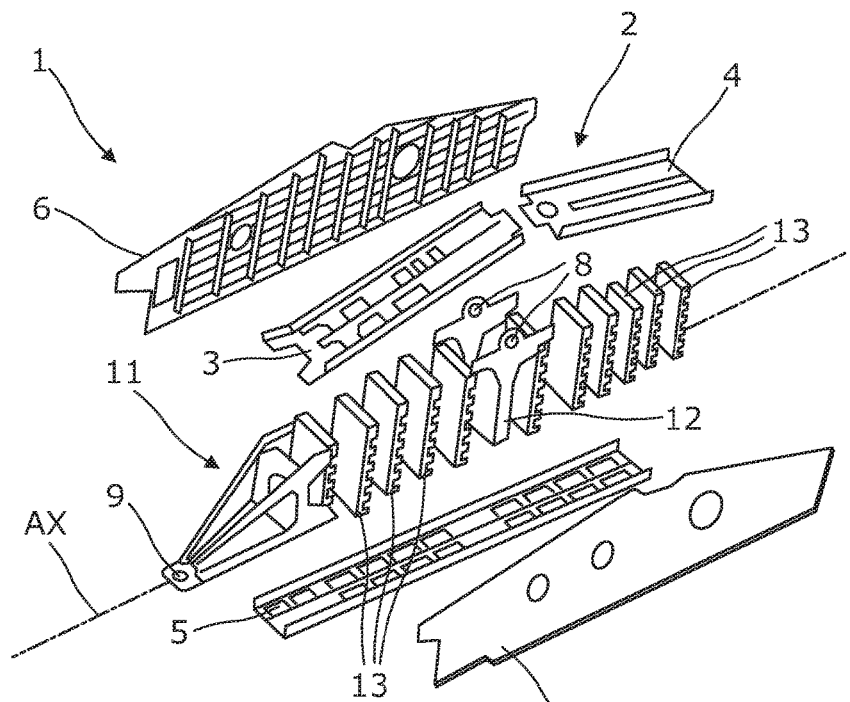
FIG. 1 is an exploded view of a primary pylon structure from the prior art.
Figure 2:
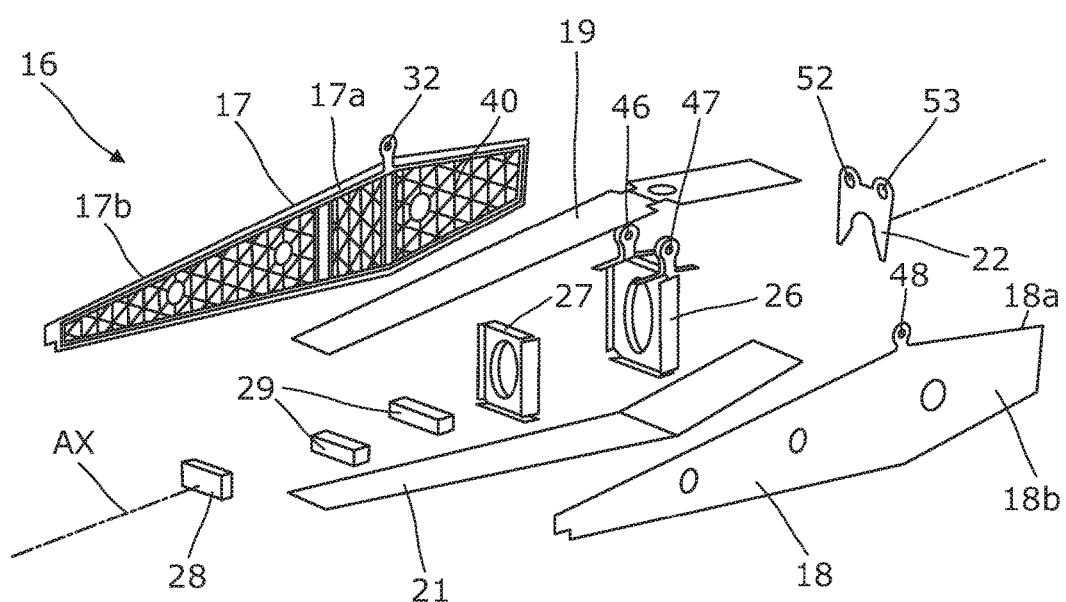
FIG. 2 is an exploded view of a pylon structure according to an embodiment of the invention.

As can be seen in FIG. 2, a pylon 16 according to an embodiment of the invention has been depicted comprising a right side panel 17 and a left side panel 18, a main front reinforcement 28 and a main rear reinforcement 22, as well as an upper stringer 19 and a lower stringer 21. These components 17, 18, 19, 21, 22 and 28, depicted as an exploded view in FIG. 2, are intended to be joined each to the other to form a strut assembly extending in a longitudinal direction AX corresponding to the direction in which the aircraft is moving.

As illustrated in the figures, the different elements of the pylon 16 have symmetrical shapes in relation to a vertical centre plane parallel to the direction AX and situated halfway down the side panels 17 and 18. These side panels 17 and 18 are therefore symmetrical to one another.

A main rear reinforcement 22 with a generally rectangular shape comprises two reinforcement fittings 52 and 53 along one edge, referred to as the upper edge. The reinforcement fittings 52, 53 traditionally take the form of an eyelet having a circular opening in the centre thereof.

The pylon 16 likewise comprises a main rear centre reinforcement 26, a main front centre reinforcement 27 and two intermediate reinforcements 29 intended to be positioned between the main front centre reinforcement 27 and the main front reinforcement 28 during assembly of the pylon 16. The reinforcements 26-29 serve to transmit the stresses coming from the engine to the strut assembly and the airfoil.

Each main centre reinforcement 26 and 27 is a machined structural part with a generally rectangular base oriented perpendicularly to the longitudinal direction AX. Each main centre reinforcement 26, 27 is recessed in its central region and reinforced over its entire circumference.

More particularly, the main rear centre reinforcement 26 comprises two reinforcement attachments 46, 47. As can be seen in the figures, each reinforcement fitting 46, 47 comprises two parallel planar lobes spaced one in respect of the other and each being shaped as an eyelet having a circular opening in its middle in a direction perpendicular to the direction AX.

Each side panel 17, 18 exhibits a contour, the shape of which is that of a convex hexagon made up of two trapeziums joined by their large base which defines a front edge 30, an upper edge 34, a rear edge 30b and a lower edge 37. Each side panel 17, 18 extends in a direction parallel to AX and exhibits an internal face 17a, 18a represented more clearly in FIGS. 3 and 4 and an external face 17b, 18b substantially parallel to the internal face. Advantageously, the upper edge 34 and the lower edge 37 are symmetrical one to the other in respect of a centre axis parallel to the direction AX. The front edge 30 is smaller than the rear edge 30b.

Figure 9:
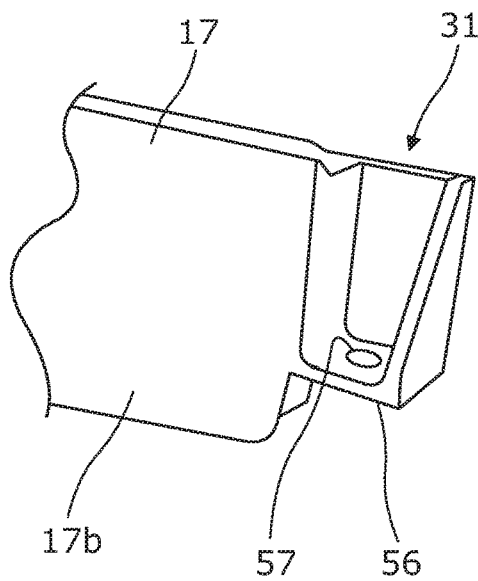
FIG. 9 is a detail view of the outside edge of the front end of a right panel of the pylon according to an embodiment of the invention.

Each side panel 17, 18 comprises, level with the front edge 30, an extension 31 which will be described later in the text with reference to FIG. 9.

Each side panel 17, 18 is a part made of steel or titanium comprising a reinforcement zone 40. The reinforcement zone 40 comprises a network of stiffeners (such as ribs or ridges). Each side panel 17, 18 likewise comprises structural components such as manholes 41 or housings 42, 43. Advantageously, the reinforcement zone 40 and the structural components 41, 42, 43 are machined from the block. Hence, the side panels of the pylon 16 are self-stiffened.

More particularly, the external face 17b, 18b of each side panel 17, 18 is substantially smooth, in other words free from any relief, as can be seen in FIG. 2 (side panel 18) and the internal face 17a, 18a comprises the reinforcement zone 40 (visible on the side panel 17 in FIG. 2).

Figure 3:
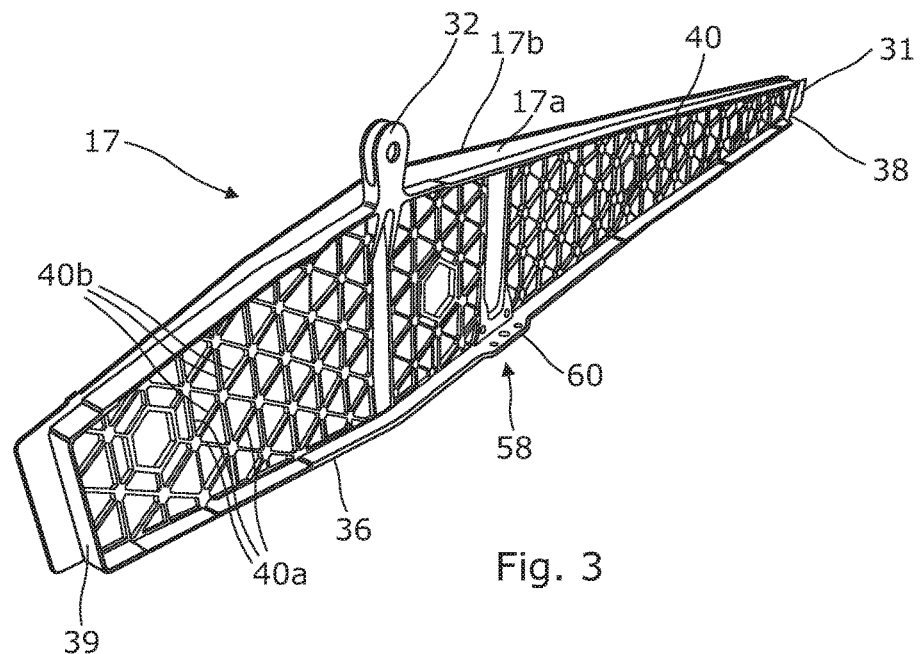
FIG. 3 is a perspective view showing the right side panel of the pylon according to an embodiment of the invention.
Figure 4:
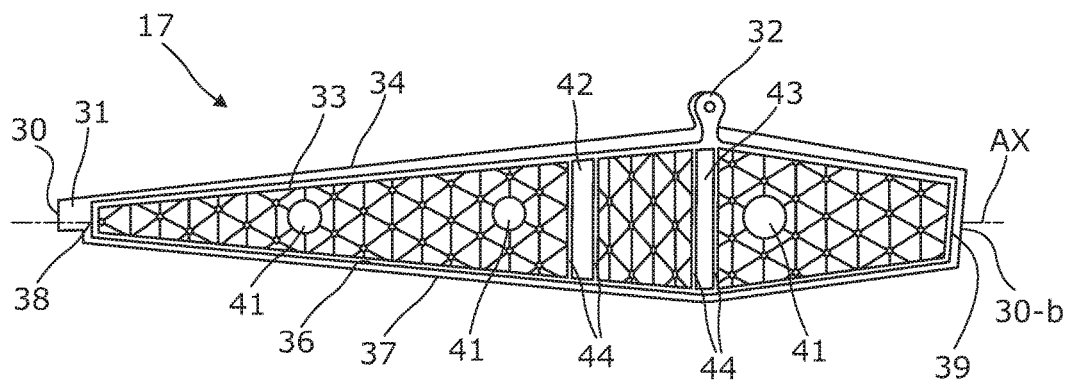
FIG. 4 is a side view of the inner side of a right panel of the pylon according to an embodiment of the invention shown alone.

As illustrated in FIGS. 3 and 4, each side panel 17, 18 comprises an upper longitudinal rib 33 which runs along the upper edge 34 of the side panel 17, 18 and a lower longitudinal rib 36 which runs along the lower edge 37 of the side panel 17, 18. These two ribs are joined one to the other at one of their ends by a front rib 38 and at the other of their ends by a rear rib 39.

Figure 8A:
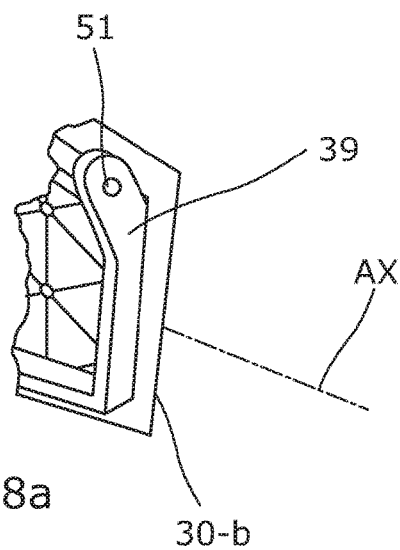
FIGS. 8a and 8b are detail views of the rear end of the pylon according to an embodiment of the invention.

As illustrated in FIGS. 3 and 8, the rear rib 39 of the right side panel 17 advantageously comprises a rear fitting 51. The rear fitting 51 extends in the extension of the rear rib 39 beyond the upper longitudinal rib 33 and is in the form of a generally planar eyelet oriented substantially perpendicularly to the longitudinal direction AX and drilled in its centre with a circular opening. In a symmetrical manner, the left side panel 18 comprises an identical rear fitting (not shown in the interests of clarity).

The four ribs, 33, 34, 38 and 39 of each side panel 17, 18 represented in FIG. 3 increase the mechanical rigidity of the side panel 17, 18. These ribs further constitute fixing supports for the upper 19 and lower 21 stringers during assembly of the pylon 16.

The four ribs, 33, 34, 38 and 39 of one and the same side panel 17, 18 delimit the reinforcement zone 40.

The inside of this reinforcement zone 40 includes a network of stiffeners comprising a plurality of ridges 40a, 40b disposed in two different directions and having intersection zones of the stiffeners. The plurality of ridges is preferably arranged in a repeated pattern. This pattern is hexagonal in shape in this case, either an isogrid type or similar. Each side of the hexagon is created by a side ridge 40a and each tip of the hexagon is linked to the opposite tip by a transverse ridge 40b. These side 40a and transverse 40b ridges constitute a regular mesh extending over substantially the entire reinforcement zone 40. Hence, each side panel 17, 18 exhibits a mechanical rigidity that is substantially greater than that of the side panels in the prior art.

According to the embodiment shown, each side panel 17, 18 likewise comprises three manholes 41 regularly spaced one from the other and each reinforced over their circumference. The manholes 41 allow access to the inside of the strut assembly so that maintenance work can be performed, for example, without having to dismantle the components making up the strut assembly.

The internal face of each side panel 17, 18 likewise comprises a front housing 42 intended to receive a side edge of the main front centre reinforcement 27 and a rear housing 43 intended to receive a side edge of the main rear centre reinforcement 26.

Each housing 42, 43 is delimited by two vertical ribs 44 extending perpendicularly to the direction AX and spaced one from the other at a distance identical to the thickness of the side edge of the main centre reinforcement received by the housing 42, 43. The base of each housing 42, 43 is smooth. Hence, the side edge of the main centre reinforcement 26, 27 housed in the housing 42, 43 is locked in this housing 42, 43. Consequently, a strong link is created between the main centre reinforcements 26, 27 and the side panels 17, 18 during assembly of the pylon 16.

As can be seen in FIG. 2, each side panel 17, 18 likewise exhibits a panel fitting 32, 48 identical in shape to the reinforcement fitting 46, 47. Each panel fitting 32, 48 extends from the upper longitudinal rib 33 to the right of the rear housing 43.

Hence, thanks to the assembly of these structural components, the side panels 17, 18 are mechanically reinforced, in other words, self-stiffened, in respect of the side panels in the prior art. Side panels 17, 18 of this kind help to reduce the number of reinforcement components of the pylon. A stiffener arrangement of this kind offers greater cohesion to the strut assembly, the side panels whereof are reinforced, such that the number of internal reinforcements may be significantly smaller. This allows the number of components of the pylon to be reduced and its manufacturing and assembly cost thereby lowered.

As illustrated in FIGS. 5 and 6, the assembly of the pylon 16 is realized by housing the main centre reinforcements 26 and 27 in the housings 42, 43 of a first side panel, for example the right side panel 17. Following this, the different reinforcements 22, 26-29 are fixed to the right side panel 17. Then, the housings 42, 43 of the second side panel, in this case the left side panel 18, are fitted on the main centre reinforcements 26 and 27 before fixing the left side panel 18 to the assembly of reinforcements. The upper stringer 19 is then positioned on this assembly, joined to the upper longitudinal ribs 33 of each side panel 17, 18 to be assembled to the other pylon components 16. Likewise, the lower stringer 21 is joined to the lower longitudinal ribs 36 of each side panel 17, 18 to be assembled to the other components of the pylon 16.

Hence, each main centre reinforcement 26, 27 is joined over its entire circumference to the side panels 17, 18 and to the stringers 19, 21 and thereby transmits the stresses from the engine to the strut assembly and to the airfoil.

The fixing of the different components to one another is ensured by any known fixing means, in this case rivets, screws and others.

During assembly of the components of the pylon 16, the panel fittings 32, 48 of the side panels 17, 18 are joined to the reinforcement fittings 46, 47 of the main rear centre reinforcement 26.

Advantageously, the four circular openings have the same diameter and the centres of the circular openings in each fitting are aligned.

Figure 7:
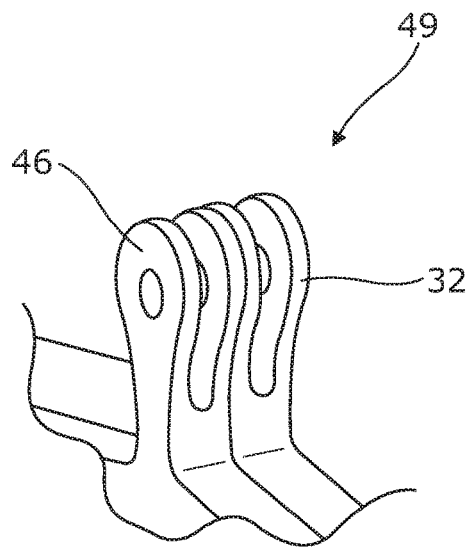
FIG. 7 is a detail view of an attachment of the pylon according to an embodiment of the invention.

This means that the four fittings 32, 46, 47, 48 constitute two double fittings. For reasons of clarity, only the double fitting, realized by the fittings 46 and 32, is presented in FIG. 6 and illustrated more clearly in FIG. 7.

Advantageously, in the pylon 16 according to an embodiment of the invention, the four fittings 32, 46, 47 and 48 together constitute a portion of a front airfoil attachment of the pylon 16. This front airfoil attachment comprises a first front airfoil semi-attachment 49 (shown in FIG. 7) situated on the side of the right side panel 17 and comprising the panel fitting 32 and the reinforcement fitting 46 joined one to the other and a second front airfoil semi-attachment (not shown in the figures), situated on the side of the left side panel 18, comprising the panel fitting 48 and the reinforcement fitting 47 joined one to the other.

The panel fitting 32 of the right side panel 17 receives a flat fixing cam in the space situated between the two parallel lobes. The reinforcement fitting 46 of the main rear centre reinforcement 26 has the same shape and the same orientation as the panel fitting 32 to which it is joined and receives a second flat fixing cam engaging with the space between the two parallel lobes. Hence, the fixing of the pylon 16 is realized by inserting a same bolt transversely into the circular openings in the two fittings 32, 46 of this attachment to create the first airfoil semi-attachment 49. In a similar way, the second front airfoil semi-attachment is constituted by the fittings 47 and 48.

Figure 8B:
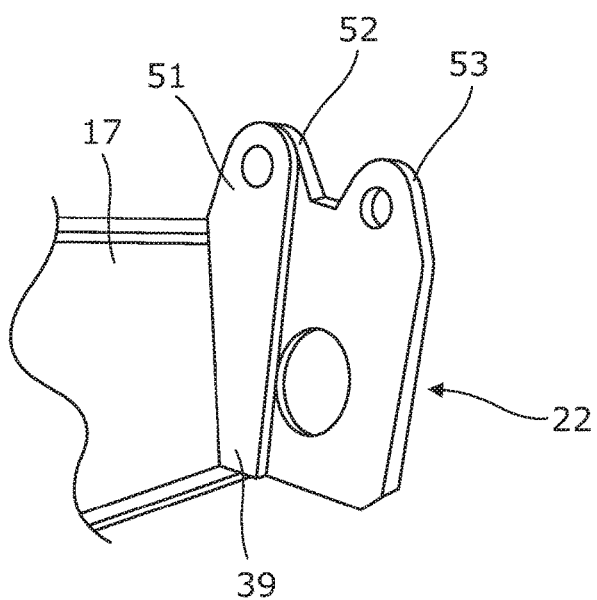

A portion of a rear airfoil attachment is realized in a similar manner with double fittings. During assembly of the pylon 16, the main rear reinforcement 22 is pressed against the rear rib 39 of the right side panel 17, so that the reinforcement fitting 52 is joined to the rear fitting 51 and the centres of the circular openings are aligned to form a first rear airfoil semi-attachment, as can be seen in FIG. 8b. Likewise, the reinforcement fitting 53 is joined to the rear fitting of the rear rib present on the left side panel 18. Hence, the fixing of the pylon 16 to the airfoil is realized by means of bolts or similar crossing the circular openings of the double attachments, in a similar manner to the fixing of the pylon 16 to the motor.

Advantageously, the side panel 17, 18 of the pylon 16 according to an embodiment of the invention incorporates front engine mount components. More particularly, the front engine mount comprises the extension 31 of the side panel 17, 18. Preferably, as illustrated in FIG. 9, the extension 31 exhibits the general shape of an open rectangular box on a first face merged with the external face 17b, 18b of the side panel 17, 18 and on a second face merged with the upper edge 34 of the side panel 17, 18.

The extension 31 thereby exhibits a base merged with the internal face 17a, 18a of the side panel 17, 18 and a lower wall 56 which extends parallel to the longitudinal direction AX and which is provided with a through-hole 57 configured to receive a fixing means of the engine (not shown) to the pylon 16.

Figure 10A:
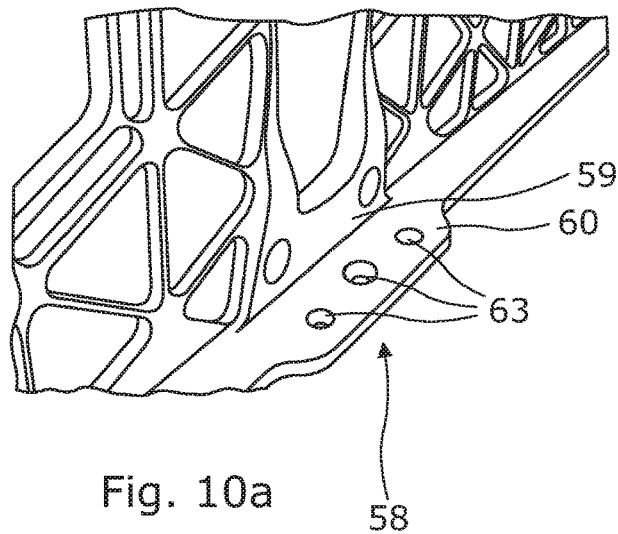
FIGS. 10a and 10b are detail views of a side portion of a panel of the strut according to an embodiment of the invention.
Figure 10B:
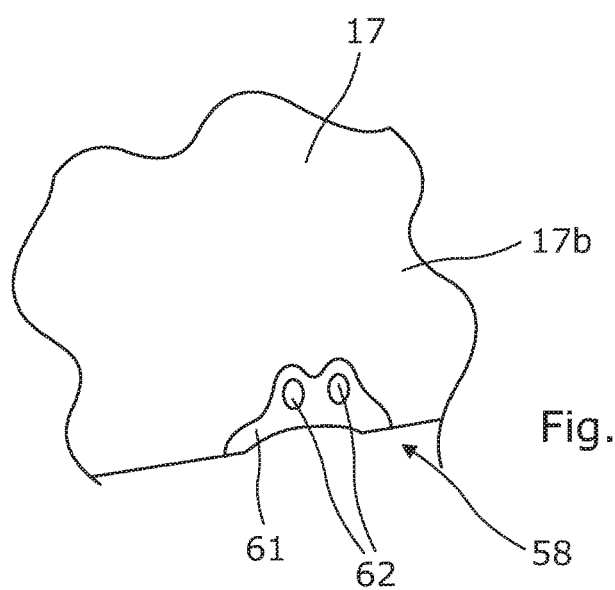

In the reference numbers in FIGS. 10a and 10b, each side panel 17, 18 likewise incorporates components of a rear engine mount 58. These rear engine mount components 58 are situated on the lower longitudinal rib 36 of the side panel 17, 18 level with the front housing 42. The rear engine mount components 58 comprise a mounting plate 60 and a consolidation zone 59. The mounting plate 60 lengthens the lower longitudinal rib 36 of the side panel 17, 18 from the internal face of the side panel 17, 18 and extends between the two ribs 44 of the front housing 42. The mounting plate 60 comprises a collection of drill holes 63 configured to receive a first rear engine mount component. The consolidation zone 59 comprises a thicker zone 61 along the external face 17b, 18b of the side panel 17, 18 level with the mounting plate 60. The consolidation zone 59 comprises a plurality of drill holes 62 configured to receive a fixing means of the engine (not shown) to the pylon 16.

Hence, the side panels 17, 18 of the pylon 16 according to an embodiment of the invention incorporate front airfoil attachment components, rear airfoil attachment components, front engine mount components and rear engine mount components. Consequently, the stresses are transferred directly from the engine to the airfoil via the side panels 17, 18, which allows components used in the prior art, such as the main front reinforcement 11, referred to as the pyramid, or the rear engine mount fittings, referred to as the spade, to be removed.

Generally speaking, the new structure of the pylon 16 according to an embodiment of the invention allows stresses to be introduced from the engine link to the airfoil, jointly level with the self-stiffened and reinforced side panels and level with the main reinforcements which include the strut assembly, which allows the distribution of mechanical stresses in the structure to be improved.

The structure of the pylon 16 according to an embodiment of the invention, comprising machined metal panels which are reinforced and stiffened, allows the architecture to be simplified to reduce the number of components making up the strut assembly and to lower the production and assembly cost thereof.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. An aircraft engine pylon comprising:
a main front reinforcement;
a main rear reinforcement;
first and second side panels;
an upper stringer and a lower stringer; and
at least first and second rear fittings, each integrated in one of the first and second side panels, respectively, and at least first and second reinforcement fittings integrated in the main rear reinforcement and each joined to one of the at least first and second rear fittings, respectively,
wherein the main front reinforcement, the main rear reinforcement, the first and second side panels, the upper stringer and the lower stringer are assembled to form a pylon assembly extending in a longitudinal direction,
wherein the first side panel comprising a first internal face oriented towards the inside of the pylon assembly and a first external face oriented towards the outside of the pylon assembly and the second side panel comprising a second internal face oriented towards the inside of the pylon assembly and a second external face oriented towards the outside of the pylon assembly,
wherein each of the first and second internal faces comprises:
a reinforcement structure containing a network of stiffeners disposed in at least two different directions and zones in which the stiffeners intersect; and
a front housing configured to receive a side edge of a main front centre reinforcement and a rear housing configured to receive a side edge of a main rear centre reinforcement; and
at least first and second panel fittings, each integrated in one of the side panels, respectively, and at least first and second reinforcement fittings integrated in the main rear centre reinforcement and each joined to one of the at least first and second panel fittings.

2. The pylon according to claim 1, wherein the reinforcement structure is delimited by an upper longitudinal rib running along an upper edge of the corresponding side panel and a lower longitudinal rib running along a lower edge of the corresponding side panel, the upper and lower longitudinal ribs being joined at one of the ends by a front rib and at the other of the ends by a rear rib.

3. The pylon according to claim 1, wherein each of the reinforcement fittings extends to a side of a side edge of the main rear centre reinforcement in a perpendicular direction to the longitudinal direction (AX) and each of the panel fittings extends from the upper longitudinal rib to a side of the rear housing.

4. The pylon according to claim 1, further comprising at least first and second extensions each situated level with a front edge of the corresponding side panel, each of the first and second extensions comprising at least one wall extending in a direction parallel to the longitudinal direction (AX), the wall being provided with a through-hole configured to receive a fixing means.

5. The pylon according to claim 1, wherein the network of stiffeners comprises a plurality of ridges arranged in a repeated pattern constituting a regular mesh over the entire surface of the reinforcement zone.

6. The pylon according to claim 1, wherein each of the rear fittings extends in the extension of the rear rib in a direction substantially perpendicular to the longitudinal direction (AX).

7. The pylon according to claim 6, further comprising a mounting plate extending to a side of the front housing in the extension of the lower longitudinal rib and a thicker zone along the external face of the side panel level with the mounting plate.

8. The pylon according to claim 7, wherein the mounting plate comprises at least a first drill hole configured to receive a fixing means and the thicker zone comprises at least a second drill hole configured to receive a fixing means.

9. An aircraft engine pylon comprising:
a main front reinforcement;
a main rear reinforcement;
first and second side panels; and
an upper stringer and a lower stringer,
wherein the main front reinforcement, the main rear reinforcement, the first and second side panels, the upper stringer and the lower stringer are assembled to form a pylon assembly extending in a longitudinal direction,
wherein the first side panel comprising a first internal face oriented towards the inside of the pylon assembly and a first external face oriented towards the outside of the pylon assembly and the second side panel comprising a second internal face oriented towards the inside of the pylon assembly and a second external face oriented towards the outside of the pylon assembly,
wherein each of the first and second internal faces comprises:
a reinforcement structure containing a network of stiffeners disposed in at least two different directions and zones in which the stiffeners intersect; and
a front housing configured to receive a side edge of a main front centre reinforcement and a rear housing configured to receive a side edge of a main rear centre reinforcement; and
at least first and second panel fittings, each integrated in one of the side panels, respectively, and at least first and second reinforcement fittings integrated in the main rear centre reinforcement and each joined to one of the at least first and second panel fittings, and
wherein at least one of the first and second side panels include a manhole in the reinforcement structure.

10. The pylon according to claim 9, wherein the manhole is reinforced along a circumference thereof.

\* \* \* \* \*